Figure 1:
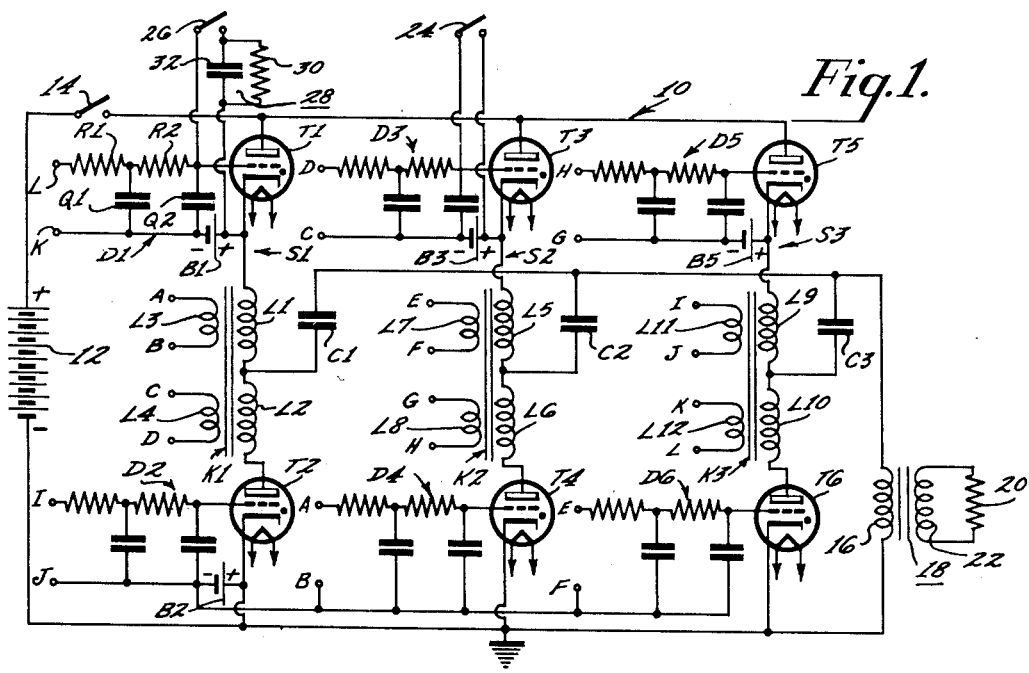

June 26, 1956 — C. C. SHUMARD — 2,752,552
SELF-EXCITED MULTIPLE GAS TUBE INVERTER
Filed Jan. 2, 1953

INVENTOR.
Charles C. Shumard
BY
ATTORNEY

United States Patent Office 2,752,552
Patented June 26, 1956

2,752,552

SELF-EXCITED MULTIPLE GAS TUBE INVERTER

Charles C. Shumard, Hopewell, N. J., assignor to Radio Corporation of America, a corporation of Delaware Application January 2, 1953, Serial No. 329,349

7 Claims. (Cl. 321—36)

This invention relates to improvements in electronic apparatus for converting a unidirectional voltage into an alternating current (A.-C.) voltage. More particularly, it relates to improved inverter apparatus for performing the inversion at high audio and/or supersonic frequencies, and to an improved means for self-exciting the inverter apparatus.

In the Patent No. 2,574,068, issued to the present inventor on November 6, 1951, and assigned to the assignee of the present invention, there is described and claimed a multiple gas tube inverter, comprising a plurality of series inverter circuits connected across a unidirectional voltage source, capable of delivering an A.-C. voltage at high audio frequencies. In order to fire the tubes of the inverter apparatus in a cyclical order, a specially constructed pulse generator must be provided. A pulse generator, for example, adapted to fire a four tube inverter apparatus cannot be used, without extensive modification, to fire a six tube inverter apparatus. Furthermore, the pulse generator requires its own source of energy for operation, thereby reducing the overall efficiency of the inverter apparatus.

In accordance with the present invention, simple self-exciting means are provided to fire any number of tubes in an inverter apparatus of the type described.

It is accordingly a principal object of the present invention to provide improved means for self-exciting a multiple gas tube inverter of the type described.

Another object of the present invention is to provide improved, self-exciting means adapted for use in an inverter apparatus of the type described regardless of the number of tubes in the inverter apparatus.

Still another object of the present invention is to provide an improved self-excited multiple gas tube inverter which is adapted to use relatively small gas tubes, each having a relatively long deionization time, thereby increasing the output frequency.

According to the present invention, the inverter apparatus comprises a plurality of series inverters each connected across the source of unidirectional voltage to be converted into an A.-C. voltage. Each of the series inverters comprises two gas triodes, a capacitor, and circuits for charging and discharging the capacitor through selected ones of the triodes. In order to self-excite the inverter apparatus, switching means are provided to fire a single tube in predetermined ones of the series inverters before the apparatus has begun cyclical operation thereby charging selected ones of the capacitors. After the selected capacitors have been charged, a single tube of a predetermined series inverter is fired to initiate cyclical conduction, thereby starting operation of the inverter apparatus. The cyclical operation of the inverter apparatus is of the type wherein a single tube from each pair in a series inverter is rendered successively conductive, and then each of the other tubes within each series inverter is rendered alternately conductive in the same order. Since the gas within each triode takes time to deionize after it has been fired, the firing order of the tubes is such that, for any given number of tubes, the time between the successive firing of each tube and its associated series mate, within each series inverter, is a maximum. By this arrangement the maximum frequency may be obtained.

Figure 2:
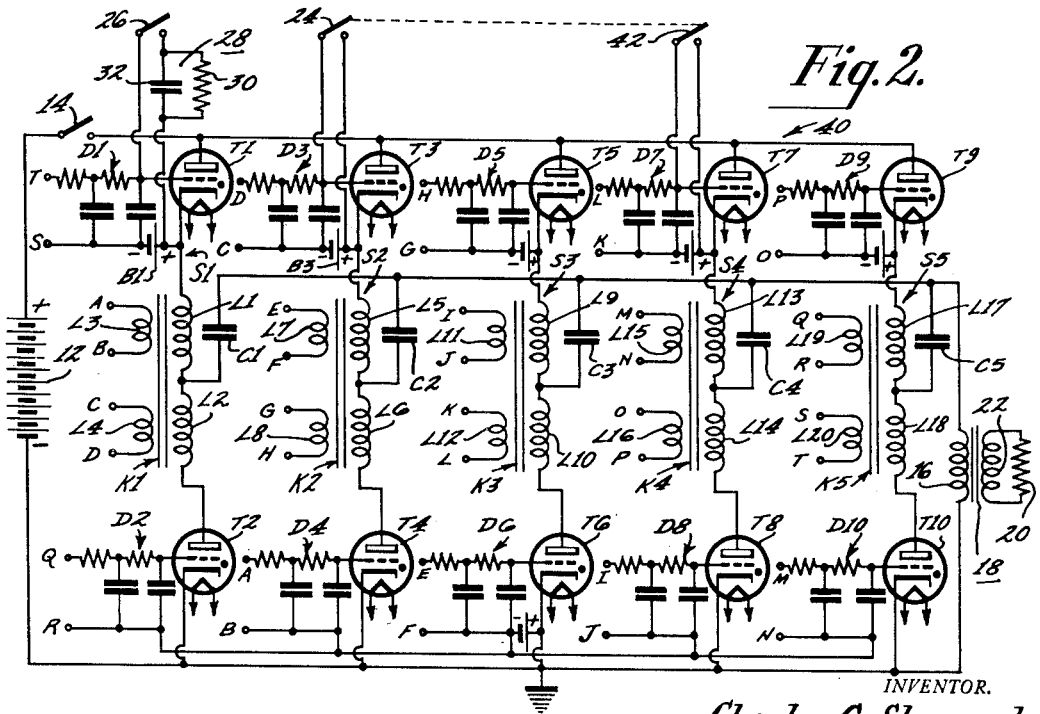

These and other objects will be more readily apparent, and the invention will be better understood when considered in connection with the drawing, in which:

Fig. 1 is a schematic diagram of a circuit representing one embodiment of the present invention, and Fig. 2 is a schematic diagram of a circuit of another embodiment of the present invention.

Referring to the embodiment illustrated in Fig. 1, there is shown an inverter 10, in accordance with the present invention. The inverter 10 comprises three series inverters S1, S2, and S3 connected in parallel with each other and across a source of unidirectional voltage 12 through a switch 14. Since the series inverters S1, S2, and S3 are similar to each other, only the series inverter S1 will be described in detail. The series inverter S1 comprises two gas discharge tubes T1 and T2 of the thyratron type. The anode of the tube T1 is connected to the positive terminal of the voltage source 12 through the switch 14. The cathode of the tube T1 is connected to the anode of the tube T2 through the serially connected windings L1 and L2. The windings L1 and L2 are wound around an iron core K1 in opposite directions with respect to each other. The cathode of the tube T2 is connected to the negative terminal of the voltage source 12 and to a point of reference potential such as ground.

Connected between the grid and the cathode of the tube T1 is a delay network D1 for the purpose hereinafter appearing. The delay network D1 comprises a pair of input terminals L and K. The terminal L is connected to the grid of the tube T1 through the series connected resistors R1 and R2. The terminal K of the delay network D1 is connected to the cathode of the tube T1 through a source of grid bias voltage B1, the negative terminal of the bias B1 being connected to the terminal K. A capacitor Q1 is connected between the terminal K and the common junction between the resistors R1 and R2. Another capacitor Q2 is connected between the grid of the tube T1 and the negative terminal of the bias voltage source B1.

A delay network D2, similar to the delay network D1 is connected similarly to the tube T2. The delay network D2 is provided with input terminals I and J. Wound in the same direction as L1 on the core K1 are windings L3 and L4 each provided with two output terminals A and B, and C and D, respectively.

Associated with, and a part of, each of the series inverters S1, S2 and S3 is a capacitor C1, C2 and C3, respectively. The capacitor C1 has one side connected to the junction between the windings L1 and L2. The other side of the capacitor C1 is connected to the negative terminal of the voltage source 12 through the primary winding 16 of an output transformer 18. A load, represented by a resistor 20, may be connected across the secondary winding 22 of the transformer 18.

The series inverter S2 comprises the tubes T3 and T4 serially connected to each other through windings L5 and L6 in the same manner as described for the tubes T1 and T2 in the series inverter S1. A pair of windings L7 and L8 are wound, in the same direction with respect to each other and to the winding L5 on a core K2, each being provided with a pair of output terminals E and F, and G and H, respectively. The delay networks D3 and D4, substantially similar to the delay network D1 and D2, are connected to the tubes T3 and T4, in the same manner as described for the series inverter S1. The delay network D3 is provided with input terminals D and C, and the delay network D4 is provided with input terminals A and B.

The capacitor C2 has one side connected to the junction between the windings L5 and L6, and the other side connected to the negative side of the voltage source 12 through the primary winding 16 of the transformer 18.

The series inverter S3 comprises the tubes T5 and T6, the windings L9, L10, L11 and L12, the delay networks D5 and D6, and the capacitor C3, all interconnected in the same manner as described for the series inverters S1 and S2. The delay network D5 connected to the tube T5, is provided with input terminals H and G. The delay network D6, connected to the tube T6 is provided with the input terminals E and F. The windings L9 and L10, and L11 and L12 are wound around the core K3 in the same manner as those of the previously described windings. The winding L11 is provided with output terminals I and J, and the winding L12 is provided with output terminals K and L.

Means are provided to self-excite the inverter of the present invention. To this end, a switch 24 is connected across the cathode and the grid of the tube T3 of the series inverter S2. The output terminals A and B, C and D, E and F, G and H, I and J, and K and L of the windings L3 and L4, L7 and L8, L11 and L12 are connected to the corresponding input terminals of the delay networks D4 and D3, D6 and D5, and D2 and D1, respectively. Thus, it will be understood that upon closing the switch 24 and the switch 14, the tube T3 is rendered conductive until the capacitor C2 becomes fully charged. A switch 26 is connected in series with the cathode and the grid of the tube T1 of series inverter S1 through a parallel network 28. The network 28 comprises a resistor 30 connected across a capacitor 32. While the network 28, is not absolutely necessary for operation of the inverter, it functions as a protective means in case the switch 26 is closed for too long a period.

The operation of the inverter circuit will now be described. Before the inverter apparatus begins normal operation, that is, regular cyclical conduction through its tubes, the switch 14 is closed. Next, the switch 24 is momentarily closed and then opened. The momentary closing of the switch 24 results in the charging of the capacitor C2 by means of current flowing in the charging circuit comprising the voltage source 12, the tube T3, the winding L5, and the primary 16 of the transformer 18. In order to initiate cyclical conduction of the inverter apparatus the switch 26 is momentarily closed and then quickly opened. This results in the removal of the negative bias on the grid of the tube T1 and causes it to fire. When the tube T1 fires the capacitor C1 becomes positively charged. Current flowing through the charging circuit comprising the tube T1, the winding L1, and the capacitor C1 results in a transformed voltage pulse across the output terminals A and B of the winding L3. This voltage pulse is sufficient to overcome the bias of the battery B2 applied between the grid and the cathode of the tube T4. Since the positive voltage on the capacitor C2 is applied to the anode of the tube T4 through winding L6, the tube T4 fires and discharges the capacitor C2 through the primary winding 16 of the transformer 18. It will be noted that current flows in one direction through the primary winding 16 to the transformer 18 when the capacitor C2 is being charged, and in an opposite direction through the winding 16 when the capacitor C2 is being discharged. Upon the firing of the tube T4, a voltage is induced across the terminals G and H of the winding L8. This voltage is sufficient to trigger the tube T5, thereby placing the positive charge on the lower side of the capacitor C3. The tube T5 upon firing will induce a transformed voltage across the terminals I and J of the winding L11 which, in turn, will trigger the tube T2. Since the lower side of the capacitor C1 has been charged positively by the previous firing of the tube T1, the capacitor C1 will now discharge through the tube T2. In a similar manner, the tube T2 will trigger the tube T3, the tube T3 will trigger the tube T6, and the tube T6 will trigger the tube T1, thereby completing one cycle. The frequency of the output A.-C. voltage appearing across the secondary 22 of the transformer 18 is determined by the number of tubes in the inverter and by the time constant of the delay networks associated with each tube. It will be noted that the greater the number of tubes employed, the greater the time each particular tube will have to become deionized after it has fired.

The recovery time of each tube, that is, the deionization time for each tube of the pair in each series inverter, is a maximum when its mate is not fired until one tube from each of the other series inverters has been fired, and is not fired again cyclically until all of the other tubes of the inverter apparatus have been fired. Such a condition is possible where the inverter apparatus comprises an odd number of series inverter circuits. In the embodiment illustrated in Fig. 1, the firing order of the tubes is as follows: T1, T4, T5, T2, T3, T6, and back again to T1.

Referring now to Fig. 2, there is shown an embodiment of an inverter 40, in accordance with the present invention, using five series inverter circuits; that is, 10 tubes. The inverter 40 is substantially similar to the inverter 10 of Fig. 1 except that it contains the series inverter circuits S4 and S5 in addition to the series inverter circuits S1, S2, and S3, as previously described. The inverter 40 is representative of an inverter apparatus using a plurality of series inverters, in accordance with the present invention, where the plurality is an odd number. It will be noted that in the inverter 40, illustrated in Fig. 2, as in the inverter 10 illustrated in Fig. 1, the output terminals of the windings of each series inverter are connected to the input terminals of the delay network of the tubes in the next succeeding series inverter. For instance, the output terminals A and B, and C and D of the windings L3 and L4 are connected to the input terminals A and B, and C and D of the delay networks D4 and D3, respectively. It should also be noted that the output terminal of the windings L19 and L20 of the series inverter S5 are connected to the input terminals of the delay networks D2 and D1 of the series inverter S1, respectively.

A switch 42 is connected in series with the grid and the cathode of a tube T7 and serves the same relative function as the previously described switch 24 across the tube T3. The switches 24 and 42 may be ganged together for simultaneous operation.

The operation of the inverter 40, of the Fig. 2, will now be described. Before cyclical conduction through the tubes of the inverter 40 may be had, predetermined ones of the capacitors in the inverter 40 must be primed, or charged. This is necessary because the tubes T2, T4, T6, T8 and T10 receive their anode voltages from the capacitors C1, C2, C3, C4 and C5, respectively. In accordance with the present invention, it is neither necessary nor feasible to charge all of the capacitors before cyclical operation of the inverter 40 can be had. In the inverter 40, illustrated in Fig. 2, the capacitor C2 and the capacitor C4 may be charged selectively by first closing the switch 14, and then by closing switches 24 and 42 momentarily. This will result in the firing of the tubes T3 and T7, and in the charging of the lower sides of the capacitors C2 and C4, looking at Fig. 2. In order to initiate the regular cyclical conduction of the inverter 40, the switch 26 is closed momentarily and then opened. The tube T1 will now conduct and place a charge upon the lower side of the capacitor C1. A transformed voltage pulse is now induced in the winding L3 and applied to the tube T4 through the delay circuit D4. After a delay determined by the time constants of the delay network D4, the tube T4 fires. It is noted that the tube T4 fires because the capacitor C2 has been charged previously by the operation of the switch 24. The firing of the tube T4 will produce a voltage pulse across the winding L8 which, in turn, will fire the tube T5 after a delay determined by the time constant of the delay network D5. The firing of the tube D5 produces a voltage pulse across the winding L11 which, in turn, will fire the tube T8. It is noted that the tube T8 has a voltage supplied to it from the capacitor C4 which has been previously charged by the operation of the switch 42. The firing of the tube T8 produces voltage pulses across the winding L16 which, in turn, fires the tube T9. The firing of the tube T9 produces a voltage pulse across the winding L19 which, in turn, fires the tube T2. The tube T2 will fire because the capacitor C1 has been previously charged by the operation of the switch 26 and, therefore, has an anode voltage.

In a similar manner, the tubes T3, T6, T7 and T10 are fired, thereby completing one cycle of operation. The firing of the tube T10 produces a transformed voltage pulse across the winding L20 which, in turn, automatically triggers the tube T1 through the delay network D1. Thus, it will be understood that the firing order of the tubes of the inverter 40 is: T1, T4, T5, T8, T9, T2, T3, T6, T7, T10, and back to T1. By firing the tubes of the inverter 40 in this manner each tube of the inverter 40 has the maximum time within which to recover, that is, for the gas within the tube to deionize after it has been fired. Such an arrangement is possible where the number of series inverter circuits in the inverter apparatus is an odd number.

It is possible to self-excite an inverter apparatus, comprising 5 series inverters; that is, 10 gas tubes, by charging predetermined capacitors other than the ones illustrated and described above. For instance, if charges, prior to the cyclical operation of the inverter 40, were placed on the capacitors C1, C2 and C3, of the inverter 40, by indvidually triggering the tubes T1, T3 and T5, the inverter may be initiated into cyclical conduction by subsequently triggering the tube T7. This arrangement would not be as efficient, however, as that shown in Fig. 2, because it would reqiure more switches and also would not allow a maximum time for deionization of each of the tubes. The most efficient arrangement for any inverter apparatus comprising an odd number of series inverters, of the type illustrated in Figs. 1 and 2, is where each alternate series inverter has a switch across the cathode and the grid of one of its tubes for the purpose of triggering them individually in order to charge their associated capacitors, and where the first series inverter has a switch in series with its grid and cathode to initiate cyclical conduction.

The inverters 10 and 40 may be stopped by opening the switch 14, or by opening any of the windings.

Thus, there has been described and claimed herein, in accordance with the objects of this invention, an improved self-excited inverter apparatus for converting a source of unidirectional voltage to an A.-C. voltage. In its preferred form the inverter apparatus comprises an odd plurality of series inverter circuits connected in shunt relationship to the unidirectional voltage source to be inverted. Starting with the second series inverter, a ganged switch is provided to trigger, at will, one tube in each of the alternate series inverters for the purpose of placing a charge on the capacitors associated with the triggered tubes. A switch in series with the grid and the cathode of one of the tubes of the first series inverter is provided to trigger this tube and to initiate cyclical conduction of all the tubes of the inverter apparatus. The firing order of the tubes is such that a single tube from each of the series inverters, after the inverter apparatus has begun normal cyclical operation, is rendered sequentially conductive, and then each of the other tubes within each of the series inverters is rendered successively conductive in the same order. By this arrangement the ionized gas within each fired tube has a maximum time within which to become deionized, thus providing an inverter capable of delivering an A.-C. voltage of supersonic frequency.

What is claimed is:

1. Apparatus for converting a source of unidirectional voltage to an A.-C. voltage comprising a plurality of series inverters, means to apply said unidirectional voltage across each of said series inverters, each of said series inverters comprising two discharge tubes, a capacitor, a charging circuit for said capacitor including one of said tubes and a discharging circuit for said capacitor including the other of said tubes, an output circuit included in said charging circuit and in said discharging circuit, a plurality of switching means connected to predetermined ones of said tubes to fire said predetermined ones of said tubes at will, and means coupled between said series inverters to fire cyclically a single tube from each of said series inverters, the tubes within each series inverter being fired alternately in each cycle.

2. Apparatus for converting a source of unidirectional voltage to an A.-C. voltage comprising a plurality of series inverters, means to apply said unidirectional voltage across each of said series inverters, each of said series inverters comprising two discharge tubes, a capacitor, a charging circuit for said capacitor including one of said tubes and a discharging circuit for said capacitor including the other of said tubes, an output circuit included in said charging circuit and in said discharging circuit, each of said tubes comprising at least an anode, a grid, and a cathode, switching means connected in series with the cathode and the grid of predetermined ones of said tubes respectively whereby to fire said predetermined ones of said tubes selectively before said apparatus has begun cyclical operation, and means coupled between said series inverters to fire cyclically a single tube from each of said series inverters, the tubes within each series inverter being fired alternately in each cycle.

3. In an inverter apparatus of the type comprising a plurality of series inverters, each of said series inverters comprising two discharge tubes connected in series with each other, a capacitor, means including one of said tubes to charge said capacitor, and means including the other of said tubes to discharge said capacitor, means to couple an output circuit to each of said capacitors, means to apply a unidirectional voltage across each series inverter, means coupled between said series inverters for rendering cyclically conductive a tube from each of said series inverters, the tubes within each series inverter being rendered alternately conductive in each cycle after said apparatus has begun regular cyclical operation; means to fire selectively a single tube only of predetermined ones of said series inverters before cyclical operation of said apparatus has begun, whereby to charge selected ones of said capacitors, and said last-mentioned means comprising means to initiate regular cyclical operation of said apparatus after said single tubes have been selectively fired.

4. In an inverter apparatus of the type comprising a plurality of series inverters, each of said series inverters comprising two discharge tubes connected in series with each other, a capacitor, means including one of said tubes to charge said capacitor, and means including the other of said tubes to discharge said capacitor, means to couple an output circuit to each of said capacitors, means to apply a unidirectional voltage across each series inverter, means coupled between said series inverters for rendering cyclically conductive a tube from each of said series inverters, the tubes within each series inverter being rendered alternatively conductive in each cycle after said apparatus has begun regular cyclical operation, said tubes comprising at least an anode, a grid, and a cathode; switching means connected in series with the cathode and the grid of a selected single tube in predetermined ones of said series inverters to fire only said single tubes at will before said apparatus has begun cyclical operation, and said coupling means between said series inverters comprising a delay network for each of said tubes.

5. In an inverter apparatus of the type comprising a plurality of series inverters, each of said series inverters comprising two discharge tubes connected in series with each other, a capacitor, means including one of said tubes to charge said capacitor, and means including the other of said tubes to discharge said capacitor, means to couple an output circuit to each of said capacitors, means to apply a unidirectional voltage across each series inverter, means coupled between said series inverters for rendering cyclically conductive a tube from each of said series inverters, the tubes within each series inverter being rendered alternately conductive in each cycle after said apparatus has begun regular cyclical operation; means connected to a single tube of alternate ones of said series inverters beginning with the second series inverter to selectively fire said single tubes at will, and switching means connected to one tube in the first series inverter to fire said one tube and to initiate cyclical operation of said apparatus after said single tubes have been selectively fired.

6. Inverter apparatus comprising a plurality of series inverters adapted to be fired in a cyclical order, means to connect each of said series inverters in shunt with each other and across a source of unidirectional voltage, each of said series inverters comprising two gas discharge tubes connected in series with each other, a capacitor, capacitor charging and discharging circuits each including a different one of said tubes and an output circuit, a delay network for each of said tubes, means including said delay network coupled between said series inverters for cyclically firing a tube from each of said series inverters, the tubes within each series converter being fired alternately in each cycle, each of said tubes having at least an anode, a grid, and a cathode, means to bias the grid of each of said tubes negatively with respect to its cathode, means to remove at will said negative bias from a selected one of the tubes in each of a predetermined number of said series inverters and to fire said selected tubes before said apparatus has begun cyclical operation, and said predetermined number of said series inverters being less than the total number of series inverters in the inverter apparatus.

7. In an inverter apparatus comprising a plurality of series inverters adapted to be fired in a cyclical order, means to connect each of said series inverters in shunt with each other and across a source of unidirectional voltage, each of said series inverters comprising two gas discharge tubes connected in series with each other, a capacitor, capacitor charging and discharging circuits each including a different one of said tubes and an output circuit, a delay network for each of said tubes, means including said delay network coupled between said series inverters for cyclically firing a tube from each of said series inverters, the tubes within each series converter being fired alternately in each cycle, each of said tubes having at least an anode, a grid, and a cathode, means to bias the grid of each of said tubes negatively with respect to its cathode, a switch connected in series with the cathode and the grid of one tube in alternate series inverters beginning with the second series inverter, and a switch connected in series with the cathode and the grid of one tube in the first series inverter.

References Cited in the file of this patent

UNITED STATES PATENTS

| | | |
|---|---|---|
| 1,891,924 | Frink | Dec. 27, 1932 |
| 1,919,977 | Fitzgerald | July 25, 1933 |
| 2,147,474 | Wagner et al. | Feb. 14, 1939 |
| 2,456,204 | Loughren | Dec. 14, 1948 |
| 2,574,068 | Shumard | Nov. 6, 1951 |